United States Patent [19]
Yurchenco et al.

[11] Patent Number: 4,524,940
[45] Date of Patent: Jun. 25, 1985

[54] MONITOR FOOT

[75] Inventors: James R. Yurchenco; Michael J. Nuttall, both of Palo Alto, Calif.

[73] Assignee: MAD Computer, Inc., San Jose, Calif.

[21] Appl. No.: 555,993

[22] Filed: Nov. 28, 1983

[51] Int. Cl.³ .............................................. A47B 91/00
[52] U.S. Cl. ..................................... 248/359; 248/371
[58] Field of Search ............ 248/359 E, 359 J, 359 F, 248/456, 649, 161, 407, 371

[56] References Cited

U.S. PATENT DOCUMENTS 1,270,609  6/1918  Ezra .................................. 248/456
4,044,980  8/1977  Cummins .......................... 248/456

*Primary Examiner*—Ramon S. Britts
*Assistant Examiner*—Ramon O. Ramirez
*Attorney, Agent, or Firm*—Fliesler, Dubb, Meyer & Lovejoy

[57] ABSTRACT

Disclosed is a monitor foot for supporting a video monitor which allows adjustment of the extension of the foot. By adjusting the monitor foot, the angle of presentation of the screen of the video monitor is adjusted. The monitor foot of the present invention is adjusted using a spring loaded ratchet means which, when engaged with the foot, prevents the sliding of the foot.

3 Claims, 5 Drawing Figures

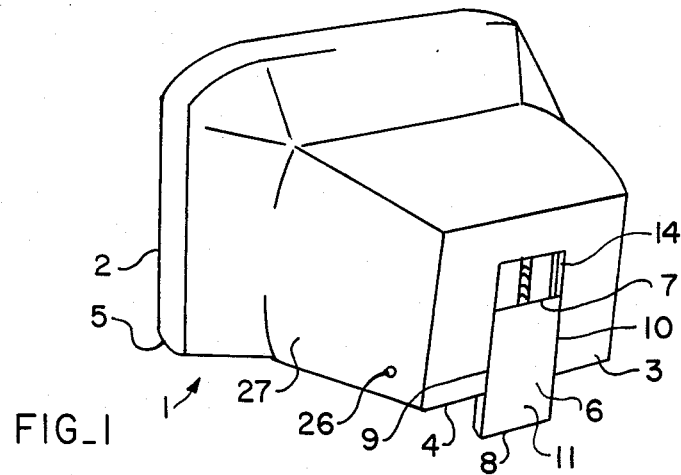
FIG_1
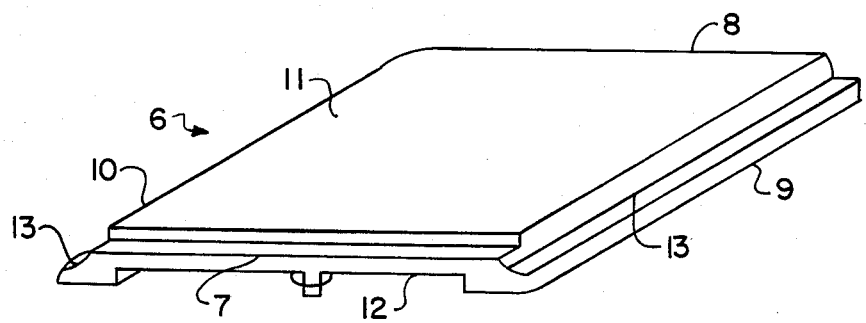
FIG_2
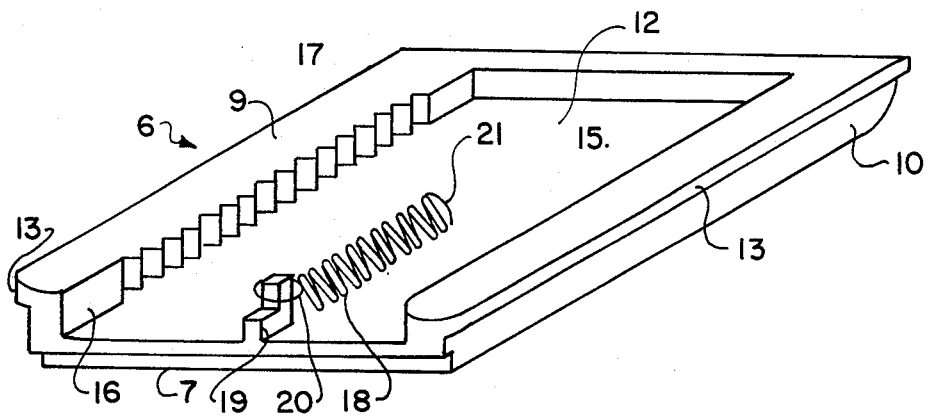
FIG_3

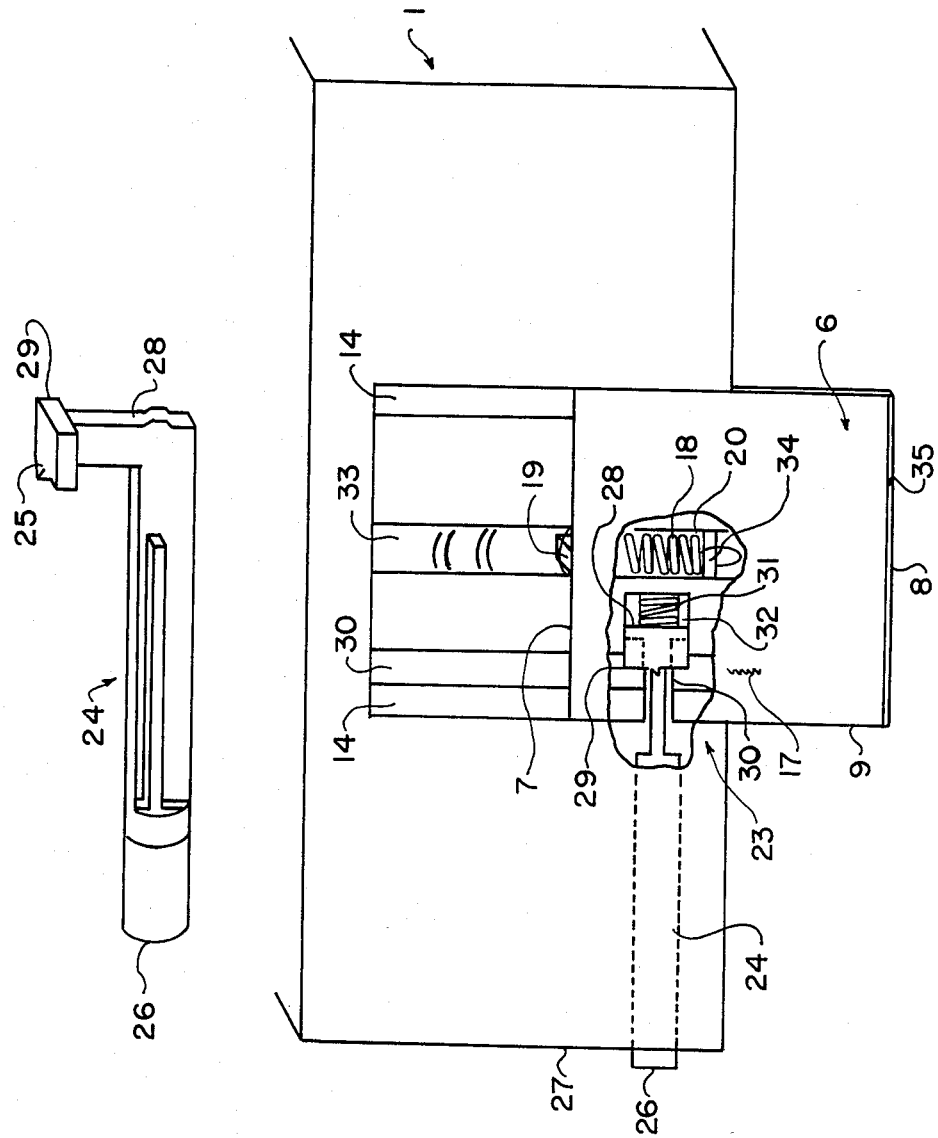

MONITOR FOOT

FIELD OF THE INVENTION

The present invention pertains to an apparatus which supports a video monitor for adjusting the angle of presentation of the screen of the video monitor.

BACKGROUND OF THE INVENTION

Video monitors, such as cathode ray tubes, have a multitude of uses. Particularly they are used as monitors for personal computers and word processors. Because a variety of persons use the monitors in a variety of settings, the angle of presentation of the screen of a video monitor should be adjustable for the comfort of the individual users. However the adjustment of the angle of the presentation of the video monitor should be simple to accomplish.

In accordance with the foregoing, there is a need for an apparatus for adjusting the angle of presentation of the screen of a video monitor which is easy to operate.

SUMMARY OF THE INVENTION

The present invention provides a monitor foot which is an appratus for easily adjusting the angle of presentation of the video monitor. The monitor foot comprises a slidable foot with rails formed on each side of the foot. On the back of the video monitor guide means are formed for receiving the rails on the slidable foot so that the foot is supported on the back of the video monitor but slides in and out to extend the bottom of the foot below the lower edge of the video monitor. Ratchet means are formed on the video monitor and the slidable foot, which when engaged, support the position of the slidable foot so that the weight of the video monitor may be placed on the foot without alowing the foot to slide. The ratchet means comprises an elongate member with a proximal end with a pawl which engages a series of teeth on the slidable foot and a distal end which protrudes slightly from the side of the video monitor. A ratchet spring is mounted on the video monitor against the proximal end of the elongate member so that the pawl tends to engage the series of teeth on the slidable foot. By depressing the protruding distal end of the elongate member, the ratchet means is disengaged from the series of teeth on the slidable foot, allowing the slidable foot to slide in and out of the guide means.

The angle of presentation of the screen of the monitor is adjusted by adjusting the extension of the slideable foot from the lower edge of the back of the monitor.

BRIEF DESCRIPTION OF THE DRAWINGS

FIG. 1 is a perspective view of the monitor foot on a video monitor.

FIG. 2 is an outside perspective view of the monitor foot of the present invention.

FIG. 3 is an inside perspective view of the monitor foot of the present invention.

FIG. 4 is a perspective view of the elongate member comprising part of the ratchet means of the present invention.

FIG. 5 is an outside perspective view showing the guide means on the back of the monitor with a cutout showing the ratchet means of the present invention.

DETAILED DESCRIPTION OF THE PREFERRED EMBODIMENT

With reference to the figures, a detailed description of the preferred embodiment is given.

The present invention pertains to an apparatus for supporting a video monitor 1 which allows the operator to adjust the angle of presentation of the screen on the video monitor 1. With reference to FIG. 1, it can be seen that the video monitor has a front 2 on which the screen (not shown) is presented to a user of the video monitor 1. Likewise, the video monitor 1 has a back 3 and a back lower edge 4. The video monitor 1 is placed on a surface (not shown). The angle at which the screen on the front 2 of the video monitor 1 is presented to a viewer of the screen is determined by the support of the video monitor 1.

According to the present invention, a video monitor 1 is supported by the front lower edge 5 which extends across the front 2 of the video monitor 1. Although not shown in the figure, the front lower edge 5 may have one or more supports in a variety of configurations formed thereon. The present invention operates to alter the angle of presentation of the screen of the video monitor 1 by pivoting the support of the video monitor 1 on the front lower edge 5 or any support along the front lower edge 5. The angle of presentation of the screen on the front 2 of the video monitor 1 is adjusted by varying the extension of a slidable foot 6 which is journaled in the back 3 of the video monitor 1. It can be appreciated that by extending the bottom 8 of the slidable foot 6 beyond the lower edge 4 of the back 3 of the video monitor 1, the angle at which the video monitor 1 pivots on the front lower edge 5 is varied. Because the screen on the front 2 of the video monitor 1 is fixed on the video monitor 1, the angle of presentation of the screen varies with the angle at which the video monitor 1 pivots on the front lower edge 5.

With reference to FIGS. 2 and 3, the form of the slidable foot 6 in the preferred embodiment is shown. For the purpose of orientation, the slidable foot 6 will be referred to as having a top 7, a bottom 8, a left side 9, a right side 10 an outside 11, and an inside 12 to be considered as if the monitor foot 6 were mounted on the back 3 of the video monitor 1 and approached from the back side of the video monitor 1.

The slidable foot includes rail means 13 formed along the left side 9 and the right side 10 of the slidable foot for securing the slidale foot 6 on the video monitor 1. As can be seen in FIG. 2 the rail means 13 comprise a ledge formed along the two sides 9, 10 of the slidable foot 6. The rail means 13 are formed such that they complement the form of guide means 14 formed on the back 3 of the video monitor 1.

The guide means are formed on the video monitor 1 for receiving the rail means 13 so that the slidable foot 6 slides to extend the bottom 8 of the slidable foot below the lower edge 4 of the video monitor 1.

With reference to FIG. 3, the inside 12 of the slidable foot 6 can be seen. In the preferred embodiment, the rail means 13 are essentially L-shaped members which extend inwardly and then to the side from a flat inner surface 15. Formed along the inwardly extended side 16 of the rail means 13 along the left side 9 of the slidable foot 6 are a series of teeth 17 which are formed for engagement of a ratchet means (not shown in FIG. 3) described below.

Further, as can be seen in FIG. 3, a slide spring 18 is attached at a first end 20 of the slide spring 18 to a slide spring support 19 near the top 7 of the slidable foot 6. The second end 21 of the slide spring 18 is attached when the slidable foot 6 is mounted on the video monitor 1 to a support bar (not shown in FIG. 3) on the video monitor 1. The slide spring 18 is tensioned such that the slidable foot 6 will tend to extend below the lower edge 4 of the video monitor 1 when the ratchet means (described below) is disengaged. In this manner, when the user wishes to adjust the angle of presentation of the screen on the front 2 of the video monitor 1, he or she need only disengage the ratchet means and lift the back 3 of the video monitor 1 while the slidable foot 6 is forced downwardly by the slide spring 18 to remain in contact with the surface on which the video monitor 1 sits. If the user wishes to tilt the screen backward, then he or she need only disengage the ratchet means and use the weight of the video monitor 1 to depress against the tension of the ratchet spring 18 and allow the slidable foot 6 to slide to the desired position.

With reference to FIGS. 4 and 5, the ratchet means 23 of the present invention is described. In the preferred embodiment, the ratchet means 23 engages the slidable foot 6 to prevent movement of the slidable foot 6 when engaged.

The ratchet means 23 includes the series of teeth 17 formed on the slidable foot 6 on the inside 12 parallel with the left side 9 of the slidable foot 6. Further, the ratchet means 23 includes an elongate member 24 with a pawl 25 for engaging one of the series of teeth 17 (see FIG. 4). The elongate member 24 is mounted on the video monitor 1 so that a distal end 26 protrudes slightly from the side 27 of the video monitor. The proximal end 28 is positioned adjacent the series of teeth 17. The pawl 25 extends orthogonally from the distal end 28 of the elongate member 24. Further, the pawl 25 includes means for journalling 29 the elongate member 24 adjacent to series of teeth 17. The means for journalling 29 comprises an essentially T-shaped member which fits over a journalling ledge 30 on the video monitor 1 as can be seen in FIG. 5.

A ratchet spring 31 is mounted on the video monitor 1 against the proximal end 28 of the elongate member 24 in a cavity 32 provided in the casing of the video monitor 1. The ratchet spring 31 is tensioned such that the pawl 25 on the elongate member 24 tends to engage the series of teeth 17 on the slidable foot 6. Further, the elongate member 24 is aligned in the case of the video monitor 1 such that by depressing the distal end 26 of the elongate member 24 the elongate member 24 is depressed against the ratchet spring 31 and the pawl 25 is disengaged from the series of teeth 17. Further shown in FIG. 5 is the slide spring 18 which is journaled in a slide spring cavity 33 in the casing of the video monitor 1. The slide spring 18 is supported by a support bar 34 across the lower end of the slide spring cavity 33 through the slide spring cavity 33 to the slide spring support 19 near the top 7 of the slidable foot 6.

The materials used for manufacturing the parts of the present invention can be any suitable hard, strong material which can carry the support of a video monitor 1. Preferably hard plastic material will be used, which can be molded or otherwise formed into the shapes needed. Of course metal or wood or other materials known in the art can be used. A non-slip pad 35 can formed along the bottom 8 of the slidable foot 6 such as shown in FIG. 5.

The present invention has been described such that the elongate member extends out the left side 27 of the casing of the video monitor 1 in accordance with the preferred embodiment. However the same apparatus can be formed to extend from the right side of the video monitor 1.

Other aspects of the present invention can be determined by a study of the specification, the claims and the drawings herein.

We claim:

1. An apparatus for adjusting the angle of presentation of a screen on the front of a video monitor, the video monitor having a lower edge, comprising:
   a slidable foot, having a top, a bottom, a left side, a right side, an inside, and an outside for supporting the video monitor at an angle of presentation;
   rail means for securing said slidable foot formed along said left side and said right side of said slidable foot;
   guide means formed on the video monitor for receiving said rail means so that said slidable foot slides to extend said bottom of said slidable foot below the lower edge of the video monitor;
   ratchet means for engaging said slidable foot to prevent movement of said slidable foot when engaged, said ratchet means including a series of teeth formed on said slidable foot on said inside parallel with said left side, and an elongate member with a pawl for engaging one of said series of teeth mounted on the video monitor, said elongate member being mounted so that a distal end of said elongate member protrudes slightly from said video monitor and a proximal end is adjacent said series of teeth, and a ratchet spring mounted on the video monitor against said proximal end of said elongate member so that said pawl tends to engage said series of teeth and so that said pawl is disengaged by depressing said distal end.

2. The apparatus of claim 1, further including:
   a slide spring connected at one end to said slidable foot and said video monitor so that said slidable foot tends to extend below said lower edge of the video monitor when said ratchet means is disengaged.

3. The apparatus of claim 1, wherein:
   said guide means is formed on the back of the video monitor and so that the extension of said bottom of said slidable foot below the lower edge of said video monitor causes the angle of presentation of the screen on the front of the video monitor to vary.

* * * * *